Figure 4:
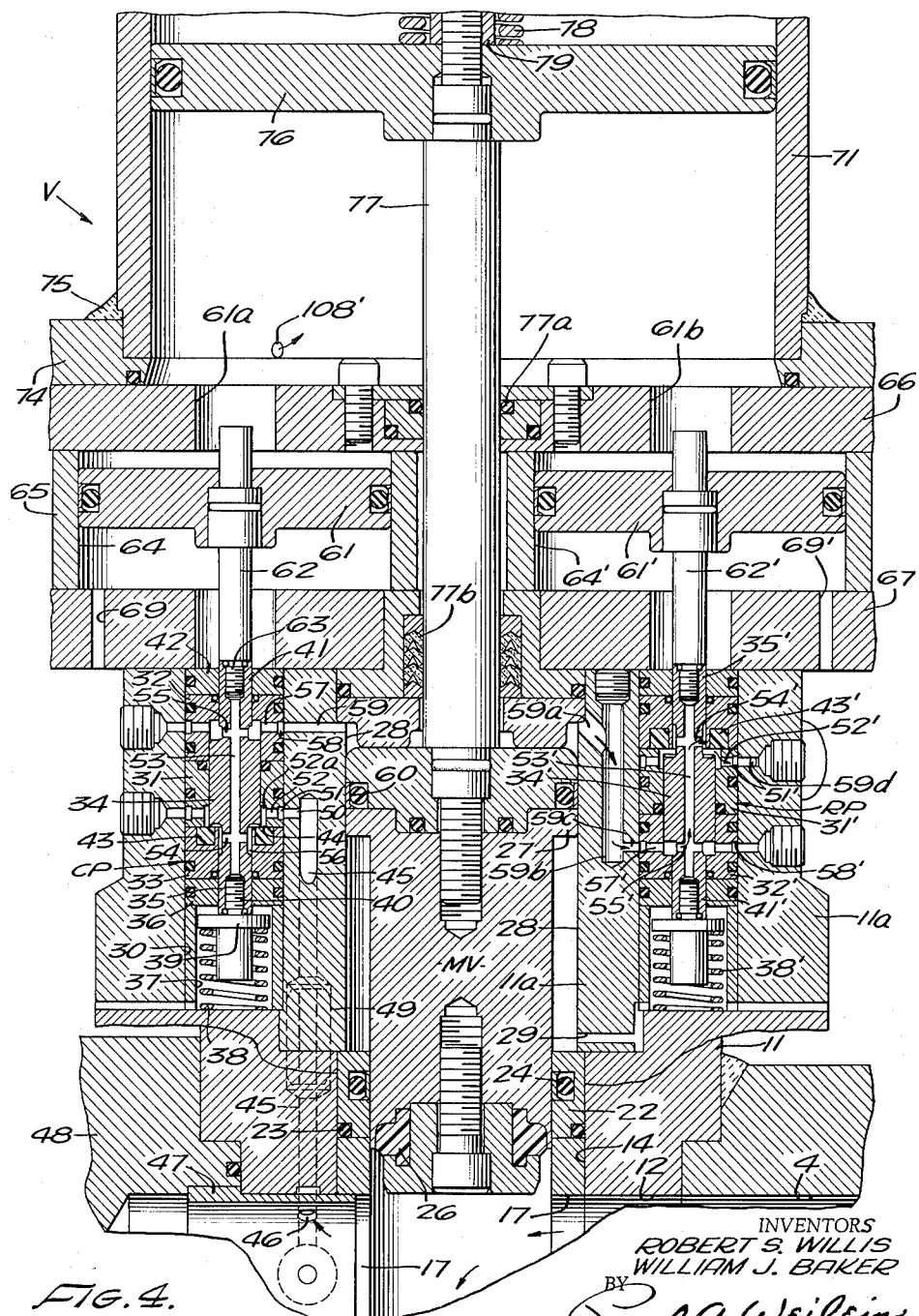

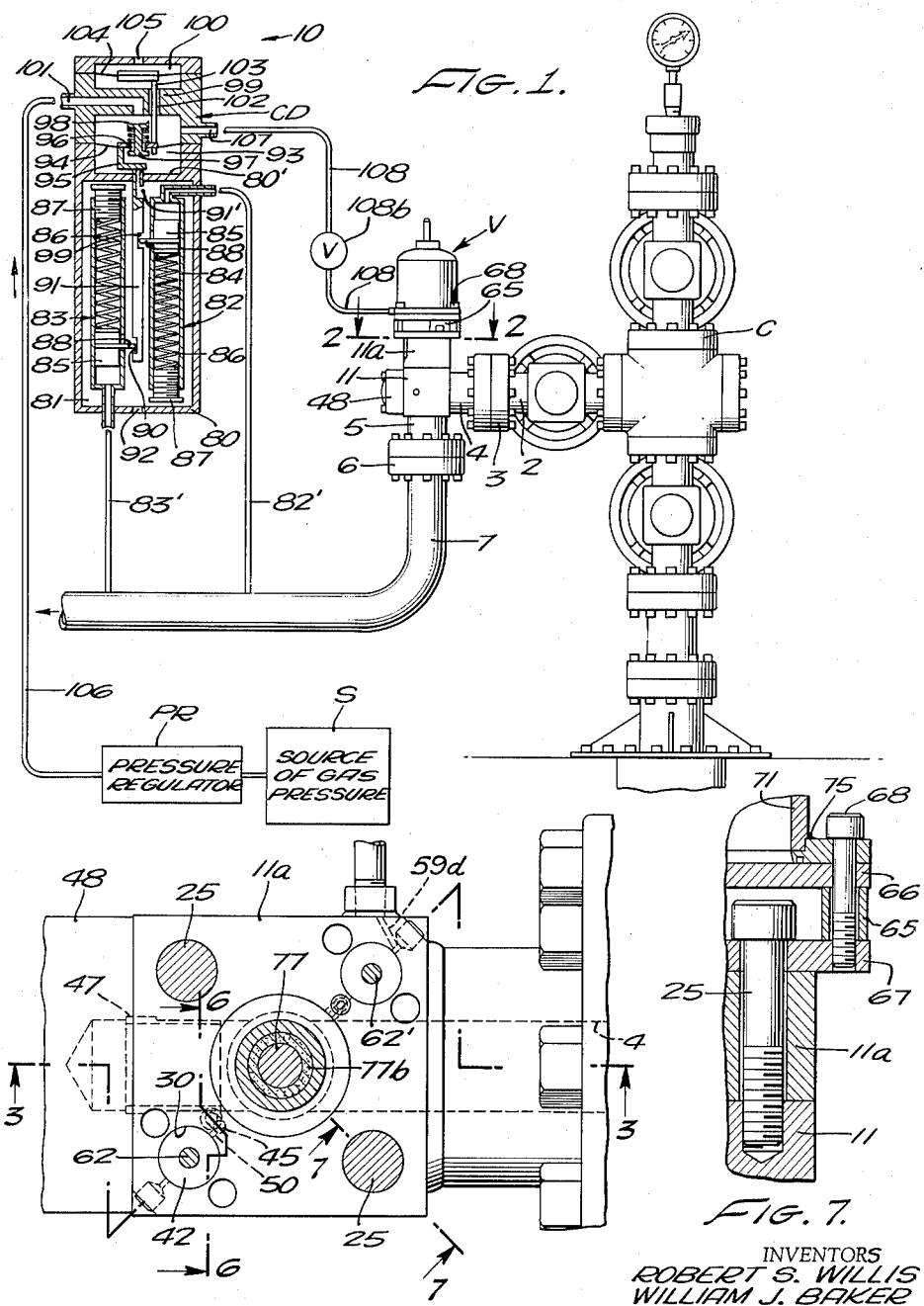

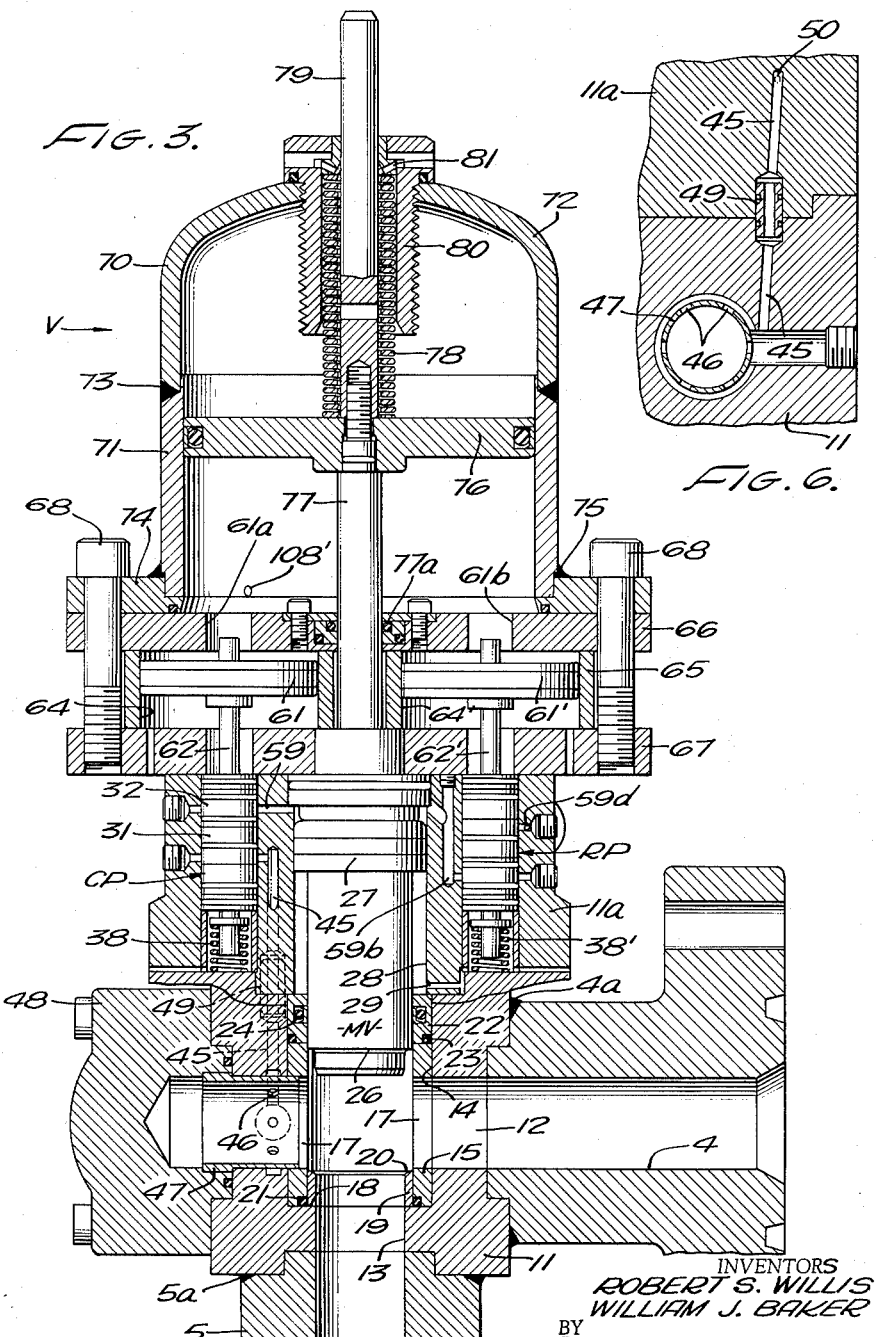

INVENTORS
ROBERT S. WILLIS
WILLIAM J. BAKER
BY
Paul A. Weilein
ATTORNEY

United States Patent Office
3,198,207
Patented Aug. 3, 1965

3,198,207
FLUID PRESSURE CONTROLLED SHUT-OFF VALVE RESPONSIVE TO PREDETERMINED LINE PRESSURES
Robert S. Willis, Long Beach, and William J. Baker, Anaheim, Calif.; said Baker assignor to said Robert S. Willis; N. Elizabeth Willis, executrix of Robert S. Willis, deceased
Filed Nov. 14, 1961, Ser. No. 152,239
15 Claims. (Cl. 137—458)

The present invention relates to a fluid pressure controlled shut-off valve and more particularly to such a shut-off valve which is adapted for but not limited to use as a shut off valve at a well head, as for example, where oil and/or gas wells are flowing under pressure.

The present invention is an improvement over the subject matter of my co-pending application, Serial No. 854,940, filed November 23, 1959, now Patent No. 3,092,136, as well as an improvement over the subject matter of my co-pending application, Serial No. 101,966, filed April 10, 1961. In each of the above identified pending applications, there is disclosed a fluid pressure operated shut-off valve which is under the control of high and low pressure pilot valves whereby upon a predetermined change in the pressure of fluid flowing through the valve housing, the valve will be automatically closed responsive to the pressure of fluid in the flow line.

As in the case of the shut-off valves of the above identified applications, the present invention contemplates a main valve housing having a flow passage therethrough and into which a main control valve is adapted to be projected so as to block the flow passage and prevent further flow upon the pressure of fluid in the flow passage falling below or exceeding a predetermined pressure, so that in the application of the present invention to the well head of flowing oil and gas wells, for example, which are unattended or which, for other reasons, require safety precautions, the flow of production fluid from the well will be automatically shut off in the event that well production fluid pressure rises excessively or drops off below a contemplated or expected surface flow pressure at a given flow rate.

An object of the present invention is to provide a high and low pressure shut-off valve, the actuation of which is more positive than in the case of the shut-off valves heretofore available, in that the shut-off valve of the present invention is positively actuated to both a closed position and an open position by an actuator device which is under the control of a source of fluid under pressure, which source may be of any desired and conventional kind, such as a separate source of gas under pressure or the fluid at the well head may be employed as a source of fluid under pressure. The invention is not to be limited to the source of control fluid pressure, but more particularly is concerned with the means of actuating the main valve in a novel manner and by means of novel structure, as will hereinafter more particularly appear.

Another object is to provide a fluid operated shut-off valve in which a main valve is adapted to be shifted into a position closing a passage through the valve body and to a second position at which the passage is open, in which an actuating motor means is connected to the shut-off valve so as to shift the latter to the two positions just referred to above, and in which the motor is fluid pressure operated and the pressure of motor actuating fluid controls a pair of pilot valves, one of which responds to high pressure in the fluid operated motor and the other of which responds to low pressure in the motor so as to control the position of the shut-off valve. In such a construction, actuation of the main valve is independent of pressure in the flow line in the event that pressure in the line is reduced to a negligible value, and hence main valve actuation is assured.

Another object is to provide a gas operated shut-off valve mechanism in accordance with the preceding objectives in which the motor fluid is air or other gas at a pressure controlled by means responsive to the pressure of fluid in a flow line which passes through the main valve housing passage.

In accomplishing the foregoing objective, a reversible pilot valve assembly is employed, such pilot valve assembly being so constructed that by mere reversal thereof, it is conditioned for utilization either as a normally closed valve, or a normally opened valve.

Other objects and advantages of the invention will be hereinafter described or will become apparent to those skilled in the art, and the novel features of the invention will be defined in the appended claims.

Figure 5:
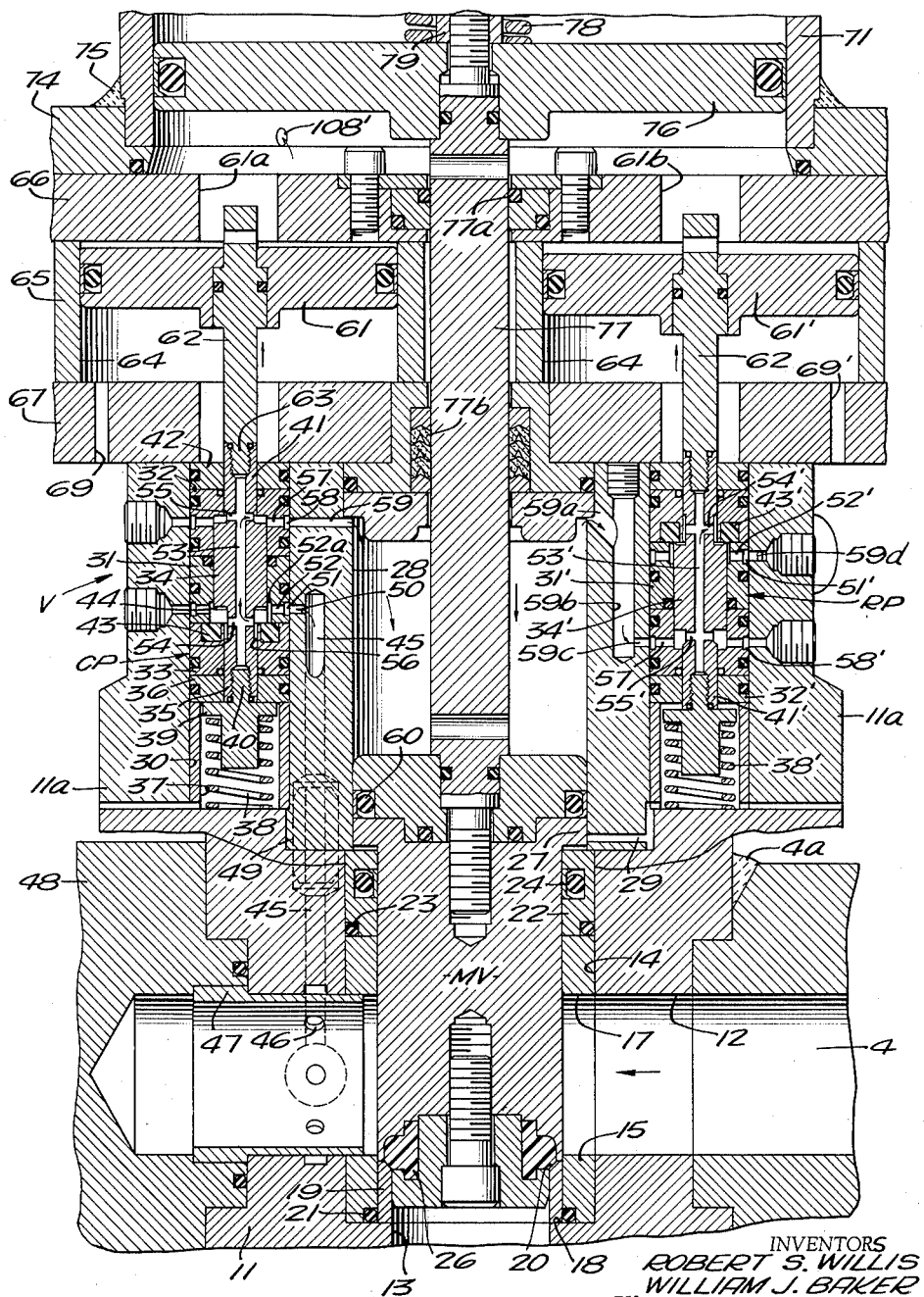

In the accompanying drawings:
FIG. 1 is a view partly in elevation and partly in section illustrating a control valve made in accordance with the invention applied to a well head for the purpose of controlling the flow of well production fluids;
FIG. 2 is a view in horizontal section on an enlarged scale as taken on the line 2—2 of FIG. 1;
FIG. 3 is a vertical sectional view as taken on the line 3—3 of FIG. 2 with certain of the parts broken away;
FIG. 4 is a fragmentary detail sectional view showing the main shut-off valve in an open position;
FIG. 5 is a view corresponding to FIG. 4 but showing the main shut-off valve in a closed position;
FIG. 6 is a fragmentary detail view in section as taken on the line 6—6 of FIG. 2; and
FIG. 7 is a fragmentary sectional view as taken on the line 7—7 of FIG. 2.

Like reference characters in the several views of the drawings and in the following description designate corresponding parts.

The shut-off valve assembly of the invention is generally designated at V and is adapted to be installed in a fluid flow line as, for example, in a Christmas tree C at the head of an oil or gas well or the like. Suitable manual valving as is customary is provided in the Christmas tree and in the line 2 leading from the Christmas tree is a coupling 3 from which extends the inlet conduit 4 of the valve V. Extending downwardly from the valve V is an outlet conduit 5 which is connected by coupling 6 to a flow line 7, leading to a suitable tank or other reservoir for the collection of well production fluids.

It is the purpose of the valve of the present invention to control the flow of well fluids from the Christmas tree through the flow line 7, particularly under circumstances which preclude personal attention to the producing well. It will be understood, however, that the valve of the present invention has other applications wherein it is desired the flow of fluid through a flow line responsive to abnormal variations in the pressure of fluid in such line.

In the present illustrative embodiment, the valve V is under the control of a fluid pressure actuated control device generally designated 10 which receives fluid under pressure from a suitable source S which may be a tank of air or other gas under pressure which is supplied to the control device CD through a pressure regulator PR as will be hereinafter described.

As an alternative, it should be understood that any suitable source of gas pressure may be employed to supply operating pressure to the control device CD and it is within the skill of the art to employ production fluid pressure from the well head if desired.

Referring more particularly to FIG. 3, it will be noted that the valve assembly V generally comprises a support block and lower valve housing section 11 which is cross bored as at 12 and 13 and counterbored in alignment with the bore 13 as at 14. Disposed in the counterbore 14 is a liner sleeve 15 having a pair of diammetrically opposed ports 17, 17 aligned with the bore 12. The inlet conduit 4 is welded as at 4a to the support block 11 and the outlet conduit 5 is welded as at 5a to the block 11 so that a fluid passage is provided leading through the inlet conduit 4 into the liner sleeve 15, and thence into the outlet conduit 5. The counterbore 14 in which the liner 15 is disposed terminates in a shoulder 18 against which the liner abuts at its lower end and against which also abuts a valve seat 19 having a beveled upper edge 20, there being a suitable O-ring or other seal 21 disposed between the valve seat 19 and the lower extremity of the liner 15 to effect a seal with the shoulder 18. The upper end of the liner 15 is engaged by a ring 22 sealed as by an O-ring 23 at the upper end of the liner 15 and provided with a suitable internal annular sealing means 24.

This seal carrier 22 is held in the counterbore 14 by the lower extremity of an upper housing section 11a which is secured to the central block 11 by screw fasteners 25 extending downwardly through the upper valve housing section 11a into the central block 11. Reciprocably disposed within the liner 15 is a main valve piston MV which is in the form of a differential end area piston. At its lower small end, the main valve MV is provided with a resilient valve head 26 and at its upper large end the main valve piston is provided with a piston head 27 slidable in a bore 28 in the upper valve housing section 11a, there being a vent 29 in the latter to allow downward movement of the main valve piston MV. It will be recognized that with the main valve piston MV in a position as shown in FIGS. 3 and 4, the flow passage through the central block 11 is open, whereas when the main valve piston MV is in the position as shown in FIG. 5, this flow passage is closed by engagement of the valve head 26 with the beveled surface 20 on the valve seat 19.

Insofar as the details of construction of the shut-off valve, as such, are concerned, the structure thus far described is substantially the same as that shown and described in my above identified co-pending patent applications. However, control means including a pair of pilot valves are provided in accordance with the present invention which are novel and which are adapted to control the position of the main valve piston MV. One of the pilot valves during operation of the subject invention is normally closed and will be herein designated as a control pilot valve CP whereas, the other of the pilot valves is normally open and will be herein identified as a reset pilot valve RP.

Referring first to the control pilot valve CP, it will be noted that the upper housing section 11a is provided with a bore 30 extending parallel to the main valve bore or cylinder 28. The control pilot valve assembly is disposed in the bore 30 and comprises a central cylindrical section 31 having inner and outer seals. At the upper end of the cylindrical section 31 is an end section 32 providing a pilot valve cylinder head at one end of the central section 31 and at the other end of the latter is a second end section 33 constituting a cylinder head at this end of the central section 31. A reciprocable pilot valve piston 34 is disposed within the pilot valve cylinder and has a stem 35 extending downwardly therefrom through the lower cylinder head section 33, through a spacer disk 36 and into a hollow spacer sleeve 37 which bottoms at the lower end of the bore 30. Within the cylindrical spacer 37 is a spring 38 engaged with a spring seat 39 threadedly connected as at 40 to the stem 36, whereby the pilot valve piston 34 is spring biased upwardly. At its upper end the pilot valve piston 34 has a stem 41 which extends through the cylinder head 32 and through a spacer disk 42 for connection to means which will hereinafter be described for urging the valve piston 34 downwardly against the spring 38. When the pilot valve piston 34 is in its downward position as shown in FIG. 4, it engages with a resilient valve seat 43 and in this connection the piston 34 is preferably formed with an annular knife edge as at 44 for effecting a tight seal with the seat 43.

Fluid is supplied to the pilot valve means CP through a passageway 45 leading from a port 46 in a liner 47 one end of which is disposed in the bore 12 of support block 11 and the other end of which is engaged by a closure cap 48, the latter being secured to the block 11 by appropriate fastener means. The passageway 45 extends through a fitting 49 which is disposed at the meeting faces of upper housing section 11a and the central block 11 (see FIG. 6), and this passage 45 leads upwardly to a port 50. This port 50 communicates with the bore 30 in which the pilot valve assembly is disposed and more particularly with an annular space 51 in the outer periphery of the central cylinder section 31 of the pilot valve assembly. A suitable number of radial ports 52 in the central member 31 lead from annular space 51 to an annular space 52a in the inner periphery of the central member 31.

The pilot valve piston 34 and its respective end stems 36 and 41 are provided with a longitudinal passage 53 therethrough and radial ports 54 and 55 located adjacent opposite ends of the piston 34. The lower piston stem 35 is recessed as at 56 so that upon removal of the piston 34 from the seat 43, fluid under pressure may pass from the passageway through the central block 11, thence through passageway 45, port 50, annulus 51, ports 52 and annulus 52a into the recess 55 and thence through port 54 into the central passage 53 of the pilot valve piston.

The upper pilot valve cylinder head 32 is ported as at 57 and these ports communicate with an annular space 58 which in turn communicates with a port or passage 59 leading into the main valve cylinder bore 28 above the head 27.

The head 27 on the main valve is sealed as at 60 in the bore 28 so that fluid under pressure passing into the bore 28 above the head 27 is imposed upon the major end area of the main valve piston in opposition to the pressure of fluid in the flow line which is imposed on the lower or minor end of the main valve piston.

Fluid pressure operated means are provided for normally holding the pilot valve piston 34 of the control pilot valve means on the seat 43 as previously mentioned. This fluid pressure operated means comprises in the illustrative embodiment of the invention, a relatively large piston 61 mounted upon a stem 62 which is connected as at 63 to the pilot valve stem 41. The piston 61 is reciprocable in a cylinder 64 formed in a disk 65 interposed between a pair of opposed plates 66 and 67 which are interconnected with screw fasteners 68, as shown in FIGS. 3 and 7, the thus assembled plates 66 and 67 and disc 65 being secured as a unit to the upper housing section 11a by the screw fasteners 25 previously described, as shown in FIG. 7. The lower side of the piston 61 is subjected to atmospheric pressure through a port 69 in the lower plate 67 whereas in a manner which will be hereinafter described, the upper face of the piston 61 is subjected to control fluid pressure.

It will be observed that the connection of the spring seat 39 to the lower pilot valve piston stem 36 of the control pilot valve means and the connection of the stem 62 to the upper control pilot valve piston stem 41 are identical so that, interchangeably, the entire pilot valve means between the stem 62 and the spring seat 39 may be reversed. Such a reversal of the parts is illustrated in the reset pilot valve means RP wherein the pilot valve cylinder head bearing the seat 43' is disposed at the upper end of the pilot valve cylinder and the spring 38' in the reset pilot valve means would normally tend to urge the pilot valve piston 34' of the reset pilot valve means into engagement with the seat 43'. The pilot valve stem 35' of the reset pilot valve means accordingly is connected to the stem 62' of a piston 61' which is reciprocable in a cylinder 64' in disk 65 previously described, and the upper face of the piston 61' is adapted to be subjected to control fluid under pressure while the lower face is subjected to atmospheric pressure through a port 69' in the plate 67.

Accordingly, it will now be observed that upon the application of fluid pressure to the control pistons 61 and 61' which are respectively connected to the control pilot valve piston and the reset pilot valve piston, these pilot valve pistons will respectively be held on their seat and off of their seat as shown in FIG. 4, whereas when the force derived from the springs 38 and 38' of the respective pilot valve means overcomes the effect of fluid pressure acting on the control pistons 61 and 61', then the control pilot valve piston and the reset pilot valve piston will be respectively off of their seat and on their seat as shown in FIG. 5.

The control device referred to above provides means for applying fluid under pressure to the upper surfaces of the control pistons 61 and 61', which pressure is also applied to means for controlling the position of the main valve piston MV.

It will be noted in FIG. 3 that there is provided above the plate 66 a bell like housing 70 composed of a cylindrical section 71 and an end section 72 which are suitably joined as by welding at 73. At its lower extremity the cylindrical bell section 71 is suitably connected to a plate 74 as by welding at 75 and the plate 74 is connected to the plate 66 referred to above. Within the cylindrical bell section 71 is a reciprocable piston 76 which is interconnected by rods 77 with the main valve piston MV so that the main valve piston and the main valve control piston 76 will move in unison under the influence of fluid pressures acting on the differential end area main valve as well as under the influence of fluid pressures acting on the control piston 76. The control piston 76 is biased downwardly by spring 78 surrounding an upstanding stem 79 which extends through the upper bell closure 72 through a threaded cap and bushing assembly 80. The cap and bushing assembly is vented as at 81 to atmosphere so that the main valve control piston 76 is subjected to atmospheric pressure on its upper face.

The above mentioned control device may be of a conventional type whereby control fluid pressure is adapted to be supplied to the valve assembly V and exhausted to atmosphere responsive to variations in the pressure of fluid in the flow line 7 or in such other flow conduit as may be desired in the utilization of the present invention. The illustrative control device comprises a housing 80 having a lower chamber 81 in which is disposed a pair of fluid pressure responsive actuators 82 and 83. Actuator 82 is a low pressure actuator, while actuator 83 is a high pressure actuator.

Each of these actuators includes a cylindrical housing 84 in which is reciprocably disposed a piston 85 loaded in one direction by coiled spring 86, the spring abutting against an adjustable threaded closure 87 at one end of the cylinder 84. A pin 88 projects laterally through a slot in the housing 84 of each of these actuators and the respective pins engage in upper and lower notches 89 and 90 in an actuator rod 91 which is reciprocably disposed in the housing 80 and projects upwardly through the upper end wall 80' of the latter. Chamber 81 in the housing 80 is vented to atmosphere through a port 92 in its lower wall.

The housing 80 also includes a chamber 93 above the chamber 81 which is divided by a diaphragm 94 to which is operatively connected a relief valve carrier 95. This relief valve carrier is connected to the upper end of actuator rod 91 and is provided with a passageway 96 in which is a reciprocal poppet valve 97 which is normally spring loaded and closed as shown in FIG. 1. The poppet valve 97 at the upper end of its stem is provided with a valve head 98 engageable with a divider wall 99 between diaphragm chamber 93 and an upper diaphragm chamber 100 which is at the upper end of the housing 80. The valve head 98 upon contact with the wall 99 is adapted to close a passageway 101 leading into the lower diaphragm chamber. The lower diaphragm chamber 93 is in communication with the diaphragm chamber 100 through an opening 102 in the wall 99, and through which extends a stem 103, this stem being connected at one end to the poppet valve carrier 95 and at the other end to a diaphragm 104 within the chamber 100. The chamber 100 above the diaphragm 104 is vented through a port 105.

Control fluid under pressure is admitted through the passageway 101 into the diaphragm chambers 93 and 100 between the respective diaphragms 94 and 104. Such control fluid may be derived from an appropriate source as referred to above and designated S, which may be by way of example a tank of compressed air, or other gas and pressure, the air being supplied through a conduit 106 to the passageway 101 through the above referred to pressure regulator so that a uniform pressure is available within the diaphragm chambers. Leading from the diaphragm chambers between the diaphragms and connected to an outlet passageway 107 is a conduit 108 which communicates with the shut-off valve V as will be presently described.

Referring now to the low and high pressure actuators 82 and 83 within the housing 80, it will be noted that a conduit 82' leads from the flow line 7 to the upper end of the cylinder 84 of actuator 82 so as to apply fluid under pressure from the flow line against the low pressure actuator piston 85 against the pressure of the spring 86. Similarly, a conduit 83' extends from the flow line 7 to the lower end of the high pressure actuator cylinder 83 so as to urge the piston in the latter upwardly against the spring therein. Hence, it will now be apparent that the actuator rod 91 will be moved upwardly by the low pressure actuator piston 85 when pressure in the flow line drops to such an extent that the spring acting on piston 85 urges the piston upwardly. Likewise, in the event that pressure in line 7 which is admitted to the high pressure actuator cylinder 83 and is applied to the piston therein, causes upward movement of the latter, then the actuator rod 91 will be moved upwardly.

Such upward movement of the actuator rod 91 will move the poppet valve carrier 95 and hence both of the diaphragms upwardly until the head 98 on the poppet valve 97 engages the wall 99 to close off passage 101 and further upward movement of the rod 91 unseats poppet valve 97 from the valve carrier 95 to allow pressure within the diaphragm chambers between the diaphragms to be exhausted through an exhaust port 91' in the upper end of the actuator rod 91 into the lower housing chamber 81 of the control device and thence to atmosphere through the vent 92. Under these circumstances, it will now be recognized that air under pressure will no longer be supplied through conduit 108 to the shut-off valve V, but instead, the air under pressure in the shut-off valve V will now be exhausted to atmosphere.

Referring now more particularly to FIGS. 4 and 5, it will be noted that the main valve actuator cylinder 71 is provided with a port 108' which is in communication with the conduit 108 leading to the control device CD just described above. Accordingly, when the control device is in the condition as shown in FIG. 1, so that operating air or gas under pressure, that is, control fluid, is supplied from the source through the line 106 and ultimately through conduit 108 and into the main valve actuator cylinder 71 through port 108', there will be applied to the lower surface of the main valve actuator piston 76 a fluid pressure of an order controlled by the pressure regulator PR such as will be effective to create an upward force on the piston 76, so as to overcome the downward force supplied by the spring 78 and to move the main valve piston MV upwardly and hold the same in the position shown in FIG. 4.

Correspondingly, the pressure in the main valve actuator cylinder 71 is applicable through ports 61a and 61b respectively, in the plate 66, to the pilot valve actuator pistons 61, 61' to provide a force acting against the pilot valve springs 38 and 38' so as to urge the respective pilot valve pistons 34 and 34' downwardly. Inasmuch as the pilot valve sub-assemblies are inverted or reversed as previously described, it will be observed in FIG. 4 that the control pilot valve is closed under these circumstances, whereas the reset pilot valve is open.

It will be noted that the actuator rod 77 extends through the plates 66 and 67 as well as through a central aperture in the disk 65, and the rod 77 is engaged by sealing means 77a in the plate 66 and by sealing means 77b in the plate 67 to prevent the flow of control fluid along the rod 77.

With the reset pilot valve open, the main valve chamber or cylinder 28 above the main valve piston head 27 is exhausted to atmosphere through a port 59a leading into a passage 59b which, through a port 59c, is in communication with the annular space 58' in the reset pilot valve cylinder head 32'. Annular space 58' communicates through the ports 57' in the cylinder head 32' with the transverse passage 55' in the pilot valve stem 41' and thence through central passage 53', transverse port 54', ports 52' in the central pilot valve cylinder section 31', and annular space 51', to outlet port 59d in the upper main valve housing section 11a.

Furthermore, with the parts as shown in FIG. 4, it will be observed that fluid flowing through the main valve housing into the flow line 7 is denied access to the upper main valve chamber 28 above the piston head 27 since the control pilot valve piston 34 is seated against its seat 43.

The main valve MV will remain open under the influence of control fluid pressure admitted to the main valve control cylinder 71 capable of holding the pilot valve control pistons 61 and 62 in the downwardly displaced positions as shown in FIG. 4, so long as the control pilot valve is closed and the reset pilot valve is open, and the force tending to hold the main valve in its upper position, that is, control fluid pressure acting on main valve control piston 76 and line pressure acting on the small end of the main valve, exceed the downward force of main valve control piston spring 78. However, in the event that line pressure drops or rises beyond a predetermined range as may be determined by adjustment of the control device actuator means, then as explained above, either of the actuator pistons 85 in the low pressure control actuator and the high pressure control actuator will move upwardly causing actuator rod 91 to shut off the control fluid pressure at passageway 101 and vent the main valve actuator cylinder 71 to atmosphere. In this event, it will now be apparent that the pilot valve actuator springs 38 and 38' will respectively move the control pilot valve piston 34 off its seat and the reset pilot valve piston 34' onto its seat, thereby opening the main valve chamber 28 above the piston head 27 to line pressure and closing off the flow from the upper main valve chamber to atmosphere.

Under these latter conditions, line pressure will act upon the larger upper end of the main valve, overcoming line pressure acting on the smaller end of the latter. However, in the event that line pressure is negligible, main valve MV will nevertheless be moved to a closed position due to the force of actuator spring 78 tending to urge the main valve actuator piston 76 and consequently the main valve MV downwardly to the piston shown in FIG. 5.

Referring now to FIG. 1, it will be noted that if desired, a manual control and vent valve of any conventional type may be installed in conduit 108 leading from the control device CD to the shut-off valve V for the purpose of shutting off control fluid pressure supplied to the main valve actuator cylinder 71 and for venting the latter to atmosphere, at will, for the purpose of controlling manually the operation of the shut-off valve. Furthermore, it will be understood that suitable remotely controlled electrically operated valving may be employed, as at 108b, for this purpose and that the shut-off valves may be controlled in groups electrically from a remotely located control panel all within the skill of the art.

Other changes and alterations may also be resorted to without departing from the spirit of the invention as defined in the appended claims.

We claim:

1. A fluid pressure operated shut-off valve comprising: a valve housing having a flow passage therethrough; said housing also having a piston chamber; main valve means for controlling the flow of fluid through said passage including a differential end area piston having its larger end reciprocable in said chamber to move said main valve means between first and second positions for opening and closing said passage; said housing having a passageway leading from said passage to said chamber at one side of said larger end; normally open pilot valve means for closing said passageway; means for holding said pilot valve means closed including a cylinder; a pilot valve actuator piston in said cylinder and connected to said pilot valve means; and means responsive to predetermined changes in pressure in said flow passage for supplying control fluid under pressure to one side of said pilot valve actuator piston to hold said pilot valve means closed and for venting said cylinder.

2. A fluid pressure operated shut-off valve comprising: a valve housing having a flow passage therethrough; main valve means movable between first and second positions for opening and closing said passage including a piston; a chamber in said housing in which said piston is disposed; an inlet fluid passageway leading to said chamber; an outlet passageway leading from said chamber; pilot valve means in each of said passageways operable to control the admission of fluid to and exhaust the fluid from said chamber at one side of said piston; control fluid pressure operated means for shifting said piston to one of said positions and for operating said pilot valve means; means for supplying control fluid under pressure to and exhausting said control fluid pressure operated means; and means for biasing said piston to the other of said positions.

3. A shut-off valve as defined in claim 2, wherein the fluid supplying and exhausting means includes means for exhausting said control fluid pressure operated means upon a predetermined rise and upon a drop in the pressure of fluid flowing through said passage.

4. A shut-off valve as defined in claim 3, wherein said piston has an enlarged head in said chamber and said inlet passageway leads from said passage to said chamber.

5. A fluid pressure operated shut-off valve comprising: a housing having a fluid passage therethrough; main valve means movable between first and second positions for opening and closing said passage; said main valve means including a differential end area piston; a chamber in said housing in which the larger end of said piston is disposed; said housing having a passageway leading from said passage to said chamber; a pair of pilot valve means for controlling the admission of fluid under pressure from said passageway to said chamber and the exhaust of fluid from said chamber; control fluid pressure operated means for moving said main valve to one of said positions and for operating said pilot valve means; said control fluid pressure operated means including a pair of pistons connected to said pilot valve means; cylinders in which the respective piston is disposed; and means for supplying control fluid under pressure to each of said cylinders and for exhausting said cylinders to atmosphere responsive to a predetermined variation in the pressure of fluid flowing through said passage.

6. A fluid pressure operated shut-off valve as defined in claim 5, wherein said control fluid pressure operated means includes a piston connected to said main valve and a cylinder in which said latter piston is disposed, said means for supplying control fluid under pressure also supplying fluid under pressure to said latter cylinder.

7. A fluid pressure operated shut-off valve comprising: a valve housing having a flow passage therethrough; a fluid pressure operated main valve having piston means for shifting the main valve to a position closing said passageway; fluid pressure operated actuator means for shifting said main valve to a position opening said passageway; control fluid pressure operated pilot valve means for controlling the application of fluid pressure to said main valve piston means; fluid pressure operated actuator means for controlling the application of control fluid pressure to said pilot valve means and to said main valve actuator means upon a predetermined variation in the pressure of fluid in said flow passage.

8. A fluid pressure operated shut-off valve comprising: a valve housing having a flow passage therethrough; a fluid pressure operated main valve having piston means for shifting the main valve to a position closing said passageway; fluid pressure operated pilot valve means for controlling the application of fluid pressure to said main valve piston; fluid pressure operated actuator means for controlling the application of fluid pressure to said pilot valve means; means for controlling the application of fluid under pressure to said last mentioned fluid pressure operated actuator means upon a predetermined variation in the pressure of fluid in said flow passage; said main valve piston means including a differential end area piston; a chamber in said housing in which the larger end of said piston is disposed; said housing having a passageway leading from said flow passage to said chamber; and said pilot valve means controlling the admission of fluid to and exhaust of fluid from said chamber.

9. A fluid pressure operated shut-off valve comprising: a valve housing having a flow passage therethrough; a fluid pressure operated main valve having piston means for shifting the main valve to a position closing said passageway; fluid pressure operated pilot valve means for controlling the application of fluid pressure to said main valve piston; fluid pressure operated actuator means for controlling the application of fluid pressure to said pilot valve means; means for controlling the application of fluid under pressure to said last mentioned fluid pressure operated actuator means upon a predetermined variation in the pressure of fluid in said flow passage; valve piston means including an actuator piston at one end of the main valve piston means; a cylinder in which said actuator piston is disposed; the means for controlling the application of control fluid under pressure to said pilot valve means also controlling the application of fluid under pressure to said actuator piston.

10. In a fluid pressure operated shut-off valve comprising: a housing having a flow passage therethrough; main valve means for closing and opening said flow passage including a differential end area piston; a chamber in said housing in which the larger end of said piston is disposed; a passageway leading from said flow passage to said chamber; and pilot valve means for controlling the flow of fluid through said passageway; the improvement including means on said housing having cylinders aligned with each of said main valve piston and said pilot valve means; pistons in the respective cylinders connected to said main valve piston and said pilot valve means; and means for supplying control fluid under pressure to each of said cylinders to bias said main valve toward open position and to operate said pilot valve means to prevent the flow of fluid from said flow passage to said chamber.

11. In a fluid pressure operated shut-off valve comprising: a housing having a flow passage therethrough; main valve means for closing and opening said flow passage including a differential end area piston; a chamber in said housing in which the larger end of said piston is disposed; a passageway leading from said flow passage to said chamber; a vent passageway leading from said chamber; and pilot valve means interposed in the respective passageways for controlling the flow of fluid from said flow passage to said chamber and from said chamber; the improvement including means on said housing provided with cylinders aligned with the respective pilot valve means; pistons in the respective cylinders connected to the respective pilot valve means; a third cylinder aligned with said main valve piston and having a piston therein connected to the main valve piston; and means for supplying control fluid under pressure to each of said cylinders to bias said main valve toward open position and to hold said first passageway closed and said vent passageway open.

12. In a fluid pressure operated shut-off valve comprising: a housing having a flow passage therethrough; main valve means for closing and opening said flow passage including a differential end area piston; a chamber in said housing in which the larger end of said piston is disposed; a passageway leading from said flow passage to said chamber; pilot valve means in said housing for controlling the flow of fluid through said passageway including a reciprocable pilot valve member; the improvement including a first cylinder aligned with said main valve piston; an actuator piston in said cylinder connected to said main valve piston; a second cylinder opening into said first cylinder between said actuator piston and said main valve; a pilot valve actuator piston in said second cylinder connected to said pilot valve member; and a control fluid port leading into said first cylinder between said actuator pistons.

13. A fluid pressure operated shut-off valve as defined in claim 12, including resilient means biasing said actuator pistons towards one another.

14. A fluid pressure operated control valve: comprising a housing having a flow passage therethrough; a main valve chamber having a differential end area piston therein with the smaller end of said piston extending into said flow passage; cooperative means at said smaller end of said main valve piston and said housing for shutting off the flow of fluid through said flow passage; a first passageway leading from the flow passage to the valve chamber at the larger end of said main valve piston; pilot valve means in said passageway; a second passageway leading from said valve chamber at the larger end of said main valve; pilot valve means in said second passageway; control fluid pressure operated means for each of said pilot valve means including a piston and a cylinder in which each piston is reciprocable; means for biasing said pilot valve means in said first passageway to an open position; means for biasing said pilot valve means in said second passageway to a closed position; fluid pressure operated means for shifting said main valve to a position with the smaller end thereof retracted from said flow passage, including a piston connected to said main valve and a cylinder in which said piston is reciprocable; said cylinders of said respective pistons of said pilot valve means and said cylinder in which said piston connected to said main valve is reciprocable being in communication with one another; and means for admitting control fluid under pressure into said cylinders simultaneously to hold said main valve in said retracted position, said pilot valve means in said first passageway closed, and said pilot valve means in said second passageway open.

15. A fluid pressure operated control valve as defined in claim 14, wherein said means for supplying fluid under pressure comprises a source of fluid under pressure and pilot valve means interposed between said source and said cylinders and responsive to a predetermined variation in the pressure of fluid in said flow line for venting said cylinders to atmosphere, whereby said pilot valve means in said first passageway will open, said pilot valve means in said second passageway will close, and said main valve will be moved into said flow passage by the pressure of fluid in said valve chamber at the larger end of said main valve.

References Cited by the Examiner
UNITED STATES PATENTS

| | | | |
|---|---|---|---|
| 784,408 | 3/05 | Krichbaum | 137—489.5 |
| 2,146,176 | 2/39 | Donaldson | 251—29 |
| 2,373,654 | 4/45 | Beekley | 251—29 XR |
| 3,018,791 | 1/62 | Knox | 137—458 |
| 3,083,726 | 4/63 | Woelfel | 137—458 |

ISADOR WEIL, *Primary Examiner.*

UNITED STATES PATENT OFFICE
CERTIFICATE OF CORRECTION

Patent No. 3,198,207                          August 3, 1965

Robert S. Willis et al.

It is hereby certified that error appears in the above numbered patent requiring correction and that the said Letters Patent should read as corrected below.

Column 2, line 62, after "desired" insert -- to control --; column 9, line 60, after "passage;" insert -- said main --.

Signed and sealed this 15th day of March 1966.

(SEAL)
Attest:

ERNEST W. SWIDER
Attesting Officer

EDWARD J. BRENNER
Commissioner of Patents